US010391811B1

(12) United States Patent
Geldard

(10) Patent No.: US 10,391,811 B1
(45) Date of Patent: Aug. 27, 2019

(54) WRITING BOARD AND METHOD OF USE

(71) Applicant: Kevin Geldard, Haltom City, TX (US)

(72) Inventor: Kevin Geldard, Haltom City, TX (US)

( * ) Notice: Subject to any disclaimer, the term of this patent is extended or adjusted under 35 U.S.C. 154(b) by 401 days.

(21) Appl. No.: 14/589,183

(22) Filed: Jan. 5, 2015

Related U.S. Application Data

(60) Provisional application No. 62/069,030, filed on Oct. 27, 2014.

(51) Int. Cl.
*B32B 3/10* (2006.01)
*B43L 1/00* (2006.01)
*B05D 1/06* (2006.01)

(52) U.S. Cl.
CPC ................ *B43L 1/008* (2013.01); *B05D 1/06* (2013.01)

(58) Field of Classification Search
None
See application file for complete search history.

(56) References Cited

U.S. PATENT DOCUMENTS

2007/0099510 A1* 5/2007 Beno ..................... A63F 9/0641 439/620.11
2011/0300294 A1* 12/2011 Nachtman ................. B43L 1/00 427/189

FOREIGN PATENT DOCUMENTS

JP 2008100401 A * 5/2008
TW 200916334 A1 * 4/2009

OTHER PUBLICATIONS https://web.archive.org/web/20100711123817/http://www.linetec.com/POWDERCOAT/Types_of_Powder_Coat.html Types of powder retreived Mar. 1, 2017.*
Tru Erase https://www.tcipowder.com/pdfs/product-literature/TruErase_TCI_white_board_powder_coatings.pdf retreived Mar. 1, 2017.*
Machine translation of TW 200916334 retrieved Mar. 1, 2017.*
Chalkboard 101 http://www.billyboardsmfg.com/Chalkboards-101.html retrieved on Sep. 8, 2017.*
Machine Translation of JP2008100401 Retrieved on Apr. 2, 2018.*

* cited by examiner

*Primary Examiner* — Christopher M Polley
(74) *Attorney, Agent, or Firm* — Eldredge Law Firm, LLC; Richard Eldredge; Beth Felix

(57) ABSTRACT

A writing board system includes a writing device and a board having a powder coating substrate and a thermosetting powder coating resin applied to the powder coating substrate. A method includes preparing the powder coating substrate and spraying the thermosetting powder coating resin applied to the powder coating substrate.

12 Claims, 7 Drawing Sheets

901

1001

WRITING BOARD AND METHOD OF USE

BACKGROUND

1. Field of the Invention

The present invention relates generally to writing boards.

2. Description of Related Art

Writing boards such as dry erase boards and/or chalk boards are well known in the art. For example, FIG. 1 depicts a front view of conventional writing board system 101 commonly used in the art. As known, board 101 includes a frame 103 that carries a board 105, which is used to write and display a drawing 107 on a surface 106. System 101 could also include a tray 109 secured to board 103 and configured to hold, for example, an eraser 111 and/or a marker 113 for convenience.

During use, the user will draw a drawing on board 105 with marker 113 and thereafter erase the drawing with eraser 111 after use. A common problem associated with system 101 is the residue left after using board 105, for example, the marker stains on board 105. As such, a user will commonly use a cleaner specially formulated to clean board 105, which in turn adds additional costs and inconvenience to the user. It should be noted that cleaning board 105 without the special cleaner can result in the board becoming damaged. A user with lack of knowledge or desire could attempt to clean board 105 with a common cleaning solution such as glass cleaner, which in turn will damage board 105.

Another common misuse of board 105 is when the user attempts to create a drawing with a non-intended marker, for example, a permanent marker, which in turn damages board 105. Further, board 105 is limited to the type of drawing means, a marker, to create the drawing. For example, board 105 is not adapted for use with crayons, chalk, and the like; all drawing means commonly used by persons in the art.

Although great strides have been made in the area of drawing boards, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
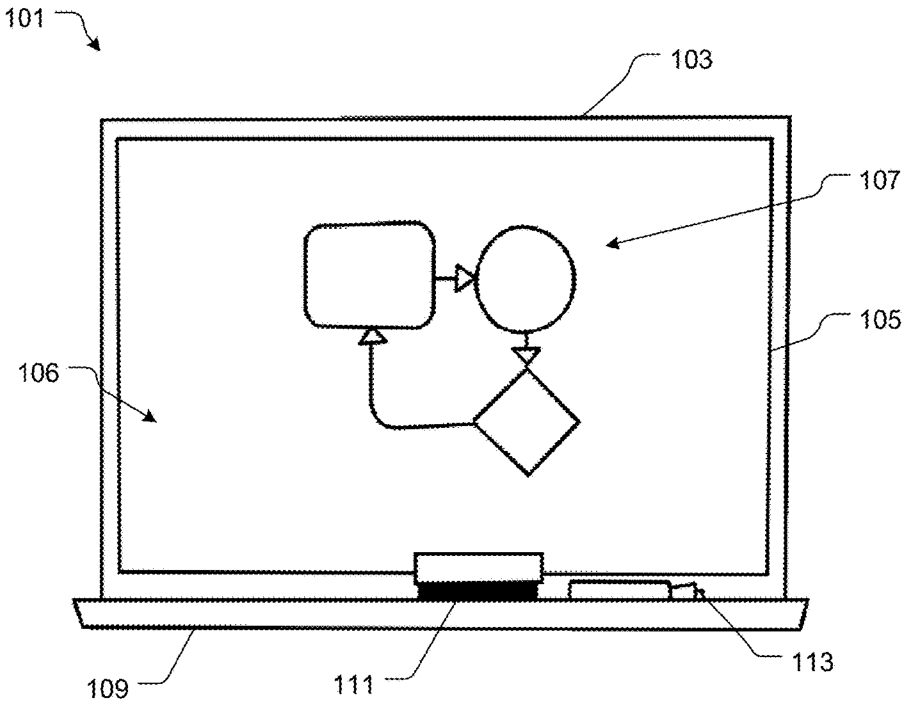
FIG. 1 (Prior Art)
FIG. 1 is a front view of a conventional drawing board system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional drawing board systems. Specifically, the drawing board system of the present application includes a board adapted for use with different types of writing means, for example, a dry erase marker, chalk, and the like for creating and displaying an image on a board. The method of manufacturing is also contemplated as a unique process, wherein the board is manufactured with a powder coating process. The powder coating process includes substrate formation, surface preparation and the application of a formulated resin material on a sheet of metal or applicable substrate. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
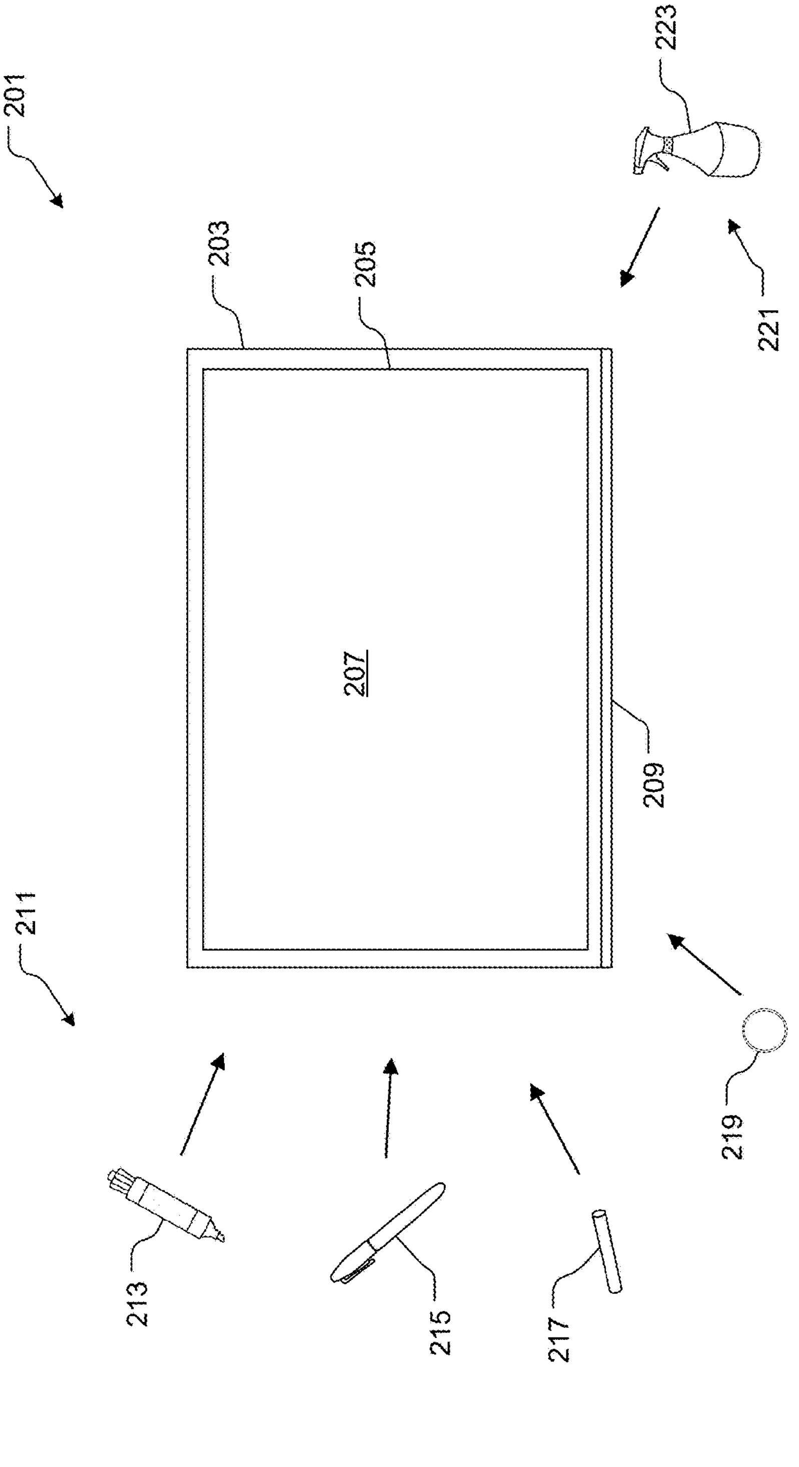
FIG. 2 is a front view of a writing board system in accordance with a preferred embodiment of the present application.

Referring now to the drawings wherein like reference characters identify corresponding or similar elements throughout the several views, FIG. 2 depicts a front view of a writing board system 201 in accordance with a preferred embodiment of the present application. It will be appreciated that system 201 overcomes at least one of the above-listed problems commonly associated with the conventional writing board systems.

In the contemplated embodiment, system 201 includes a frame 203 configured to carry a board 205 having a surface 207 for writing and displaying images thereon. System 201 could also include a tray 209 and/or other means to secure the writing or cleaning devices to frame 203.

One of the unique features believed characteristic of the present application is the ability to use different writing devices 211 with board 205. For example, the contemplated writing devices 211 could include a dry erase marker 213, a permanent marker 215, and/or chalk 217. The material composition of surface 207 allows anyone of these different types of devices to be utilized for displaying an image on surface 207. In the contemplated embodiment, chalk 217 could be a liquid chalk marker, e.g., markers that can easily be removed by a non-abrasive cloth/damp cloth and/or fiber cloth/pad, containing water or a surface cleaning solution/solvent.

It will also be appreciated that surface 207 allows a fastening device 219 to secure thereto. For example, device 219 could include a structure having an adhesive backed surface that adhesively secures to surface 207. In another contemplated embodiment, device 219 could include a body having a magnet, which in turn is magnetically secured to board 207.

Thus, it is evident that board 205 provides effective means to display an image with one or more different types of writing device, a feature greatly desired in the art.

Another unique feature believed characteristic of the present application is the ability to use common cleaners 221 during cleanup of board 205. For example, a bottle 223 of household cleaning product could be used to clean the surface 207. It should be noted that the exemplary cleaning solution is commonly used in the art; however, the cleaning solution, along with other types of commonly used cleaning solutions, destroy conventional writing surfaces. In the exemplary embodiment, such cleaning solutions do not adversely affect the structural integrity of surface 207.

Figure 3:
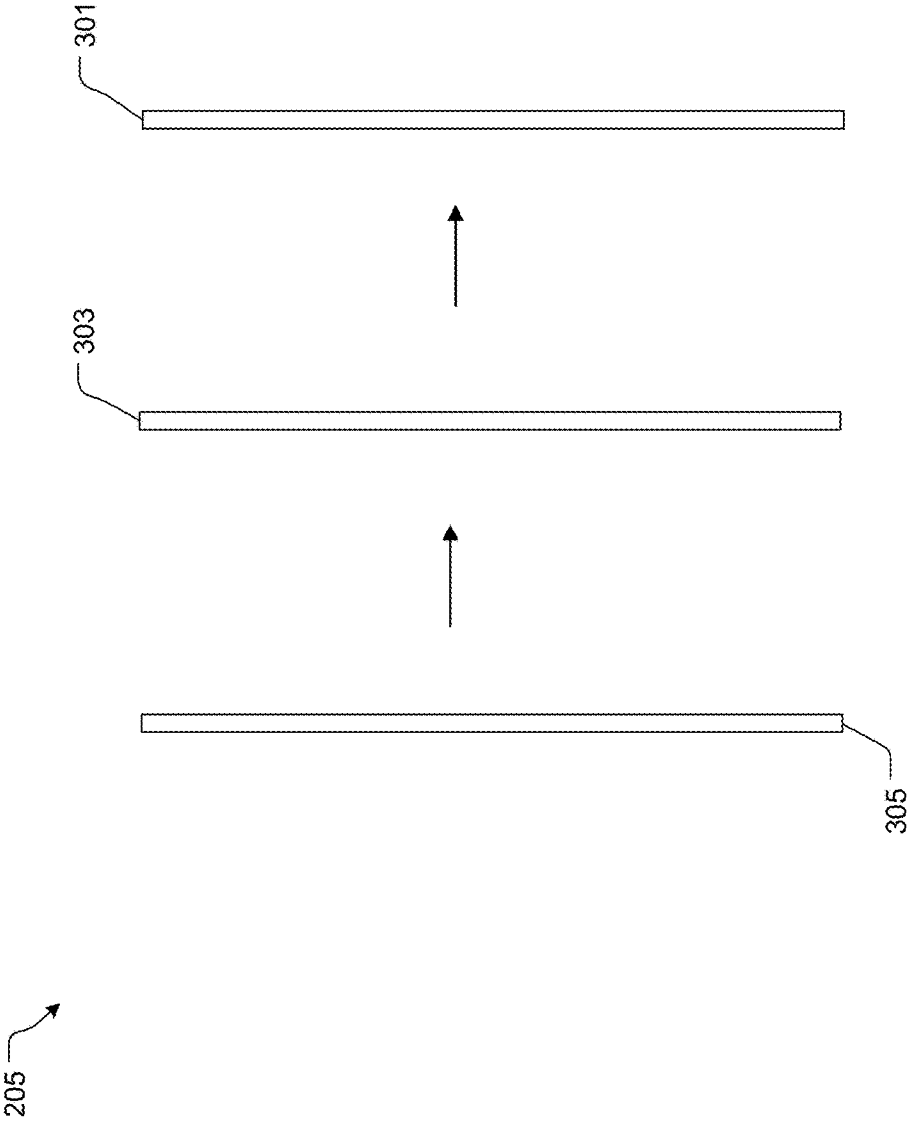
FIG. 3 is a side view of a board of the system of FIG. 2.

Referring now to FIG. 3 in the drawings, a side, exploded view of board 205 is depicted. In the contemplated embodiment, board 205 includes an optional base board 301 configured to attach to a powder coating substrate 303, which in turn is coated with a formulated thermosetting powder coating resin material 305. In the preferred embodiment, substrate 303 could be any type of substrate the powder coating material could be applied thereto for writing applications. The substrate could include, for example, metals such as steel, stainless steel, aluminum, and so forth in addition to other types of materials such as glass, wood, medium density fiberboard.

It should be understood that material 305 is applied via an electrostatic spray coating process. Thus, in the preferred embodiment, the layer of the formulated powder coating resin material 305 provides means for the various types of writing devices to display an image thereon and for different types of cleaning solutions to be utilized during the cleanup process. It should be understood that material 305 is not a sheet applied to the writing surface, but a powder coating.

It will be appreciated that the formulated powder coating material layer does not require a polyurethane film resin to be applied thereon, which is a common disadvantage of conventional writing boards. It should be understood that the resin layer commonly used with conventional writing boards limits the types of writing devices and cleaning solutions that can be used with the board.

The powdered coating resins used to create the variable writing surfaces are comprised of many formulations and compositions. The primary powder coating resins that will be used to create the writing surfaces are Thermosetting Powders that include variable formulations of Epoxy, Epoxy-Polyester Hybrid, Urethane Polyester, Polyester TGIC and Acrylic. The powder coating application process is described in No. 5, E.

It should be understood that the powder coating process is generally unique from other processes used in the conventional writing boards. It is true that the some writing boards use a multilayer, multi-process, sheet film resin polyurethane process to create the boards. The key difference of the powder coating process is that there are no liquid binders or multilayer, sheet film process required to create the final coating on the substrate material.

Figure 4:
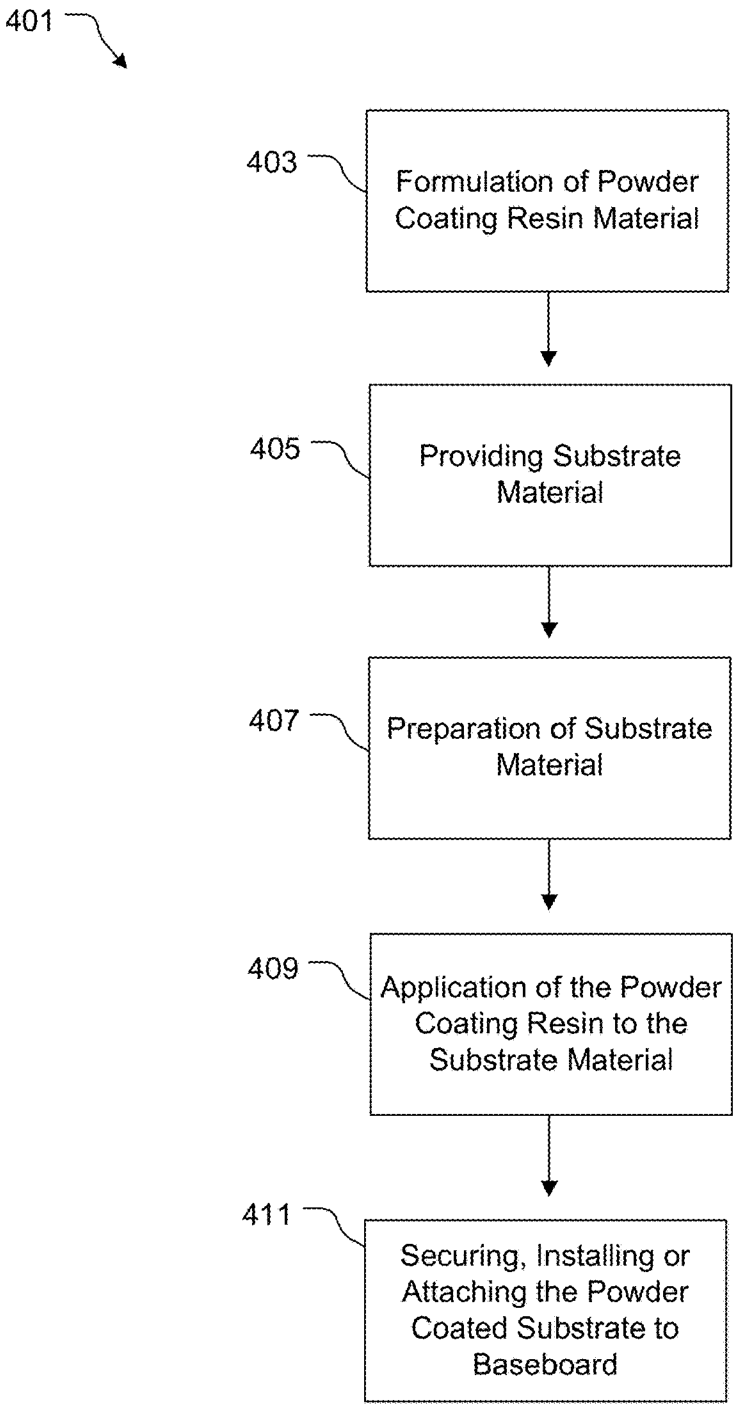
FIG. 4 is a simplified flowchart in accordance with a preferred embodiment of the present application.

In FIG. 4, a simplified flowchart 401 is used to depict the manufacturing process in accordance with a preferred embodiment of the present application. As depicted, flowchart includes the process of creating the composition of powder coating material used to create surface 207, as depicted by box 403. The two major base powder coating resins are Thermosetting Powders and Thermoplastic Powders. The Powder coating resins with variable formulations will be used for different writing surfaces. The Powder Coating Formulations would include variations in the resin compositions for Finish, Texture, Gloss, Color, Hardness, Interior and Exterior Applications.

At the same time, the substrate material is selected for the application process of the powder coating material thereon, as depicted in boxes 405. In box 407, the substrate material is prepared for the application of the powder coating resin material, which includes the process of cutting, forming, bending in addition to surface preparation such as sanding, abrading, cleaning, and preheating. After the spraying and curing process, the metal sheet or substrate is secured to a baseboard in preparation for use. In box 409, the application of the powder coating resin to the substrate material includes, for example, electrostatic spray, which is the preferred and commonly known method known in the art, then the fluidized bed, and the electrostatic fluidized bed. The last process, as depicted in box 411, includes securing, installing or attaching the powder coated substrate to a baseboard.

In the contemplated embodiment, box 403 represents a base substrate material that is inclusive of all substrate materials in all shapes, sizes and forms. Item 405 represent the cleaning and preparation of the substrate material for the application of the powder coating process, which includes the steps: Step 1, create substrate design; Step 2, abrade substrate material surface to a profile that will properly accept the adherence of the powder coating process; Step 3, clean substrate material surface; Step 4, depending on the desired process, the substrate material surface may have to be pre-heated before the application of the powder coating powder product; Step 5, attach substrate material to a grounded electrode so as to accept the positively charged powder coating powder Step 5; and an alternate or additional process includes attaching a powder coated substrate material to a back board or install in a frame.

Figure 5:
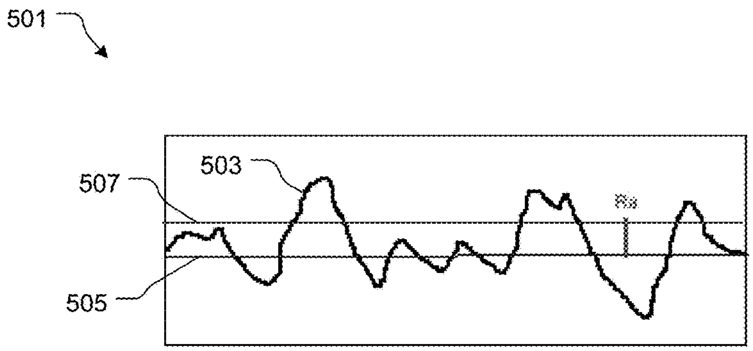
FIGS. 5-10 are exemplary graphs depicting features of the surface profiles of one or more alternative embodiments of the present application.
Figure 6:
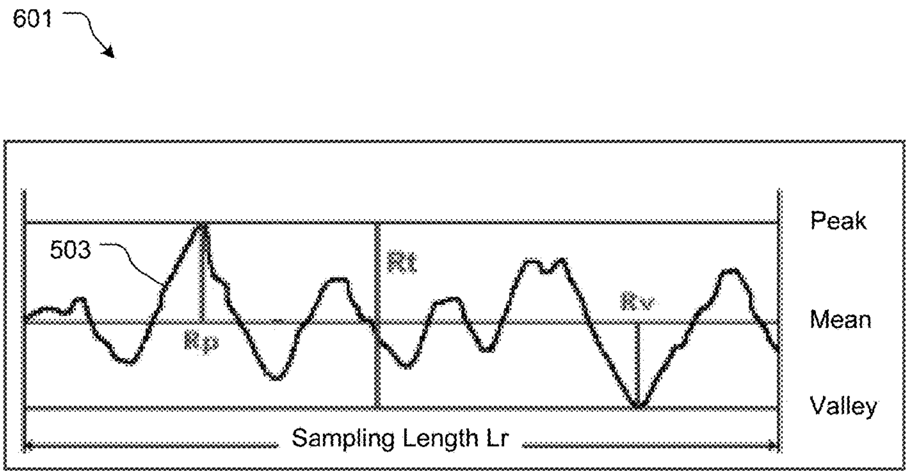
Figure 7:
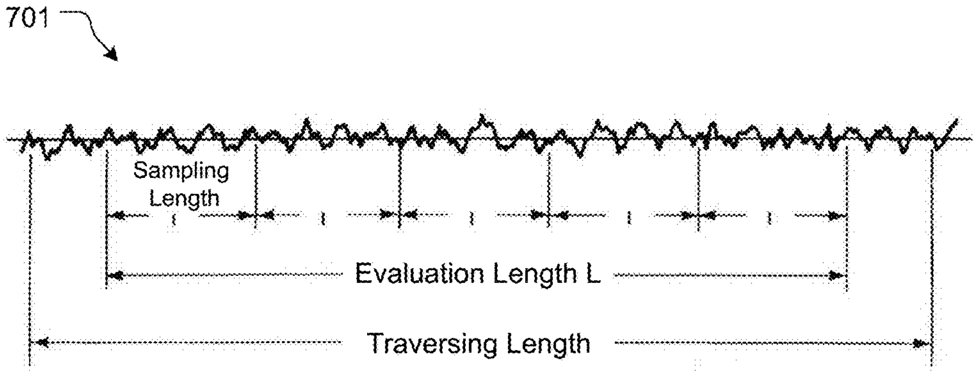

Referring now to FIGS. 5-10 in the drawing, various graphs are illustrated to depict the surface characteristics of the various exemplary embodiments discussed below. In FIG. 5, a graph 501 depicts a surface contouring 503, a mean line 505, and the average line 507. Thus, the RA value is determined as the average surface variation above the mean line. In FIG. 6, the RQ Measurement or RMS, Root mean square roughness is the square root of the sum of the squares of the individual heights and depths from the mean line, as depicted in graph 601. In FIG. 7, the sample, evaluating, and traversing lengths are depicted in graph 701.

The Mean Roughness (Roughness Average Ra) is the arithmetic average of the absolute values of the roughness profile ordinates. Ra is one of the most effective surface roughness measures commonly adopted in general engineering practice. It gives a good general description of the height variations in the surface. The units of Ra are micrometers or micro inches. It should be noted that Ra is also called AA and CLA. The equation (1) for the Ra value is depicted below with the Z(x) equal to the profile ordinates of roughness profile.

$$R_a = \frac{I}{I}\int_{\theta}^{I} |Z(x)|\,dx \tag{1}$$

Figure 8:
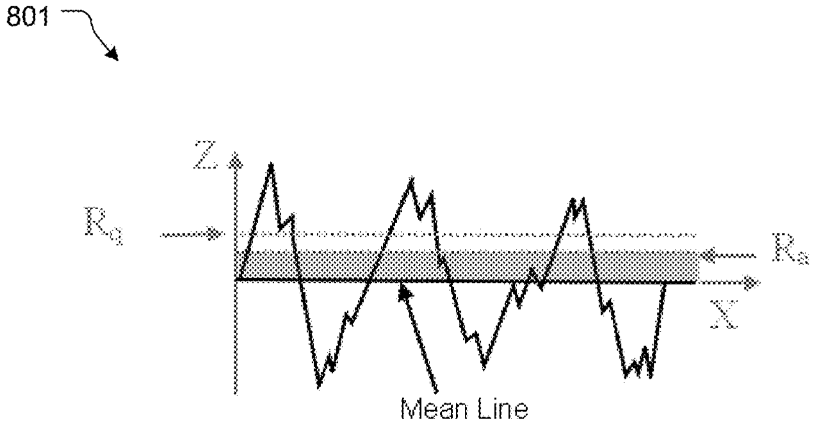

As depicted in graph 801 of FIG. 8, the Root Mean Square (RMS) roughness (Rq) is the root mean square average of the roughness profile ordinates. It should be noted that Rq is also called RMS.

Figure 9:
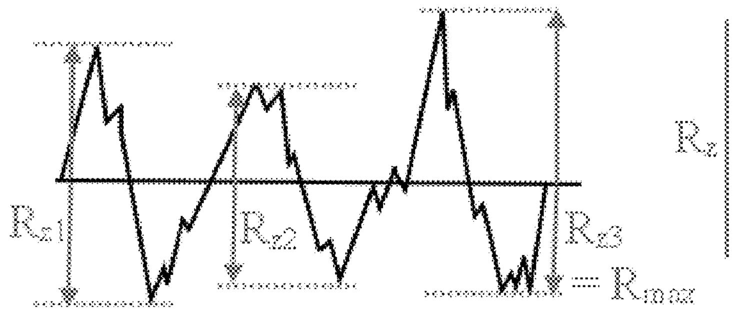

In FIG. 9, graph 901 depicts the Single Roughness Depth (Rzi) is the vertical distance between the highest peak and the deepest valley within a sampling length. The Mean Roughness Depth (Rz) is the arithmetic mean value of the single roughness depths of consecutive sampling lengths. The Maximum Roughness Depth (Rmax) is the largest single roughness depth within the evaluation length. It should be noted that units of Rz are micrometers or micro inches.

Figure 10:
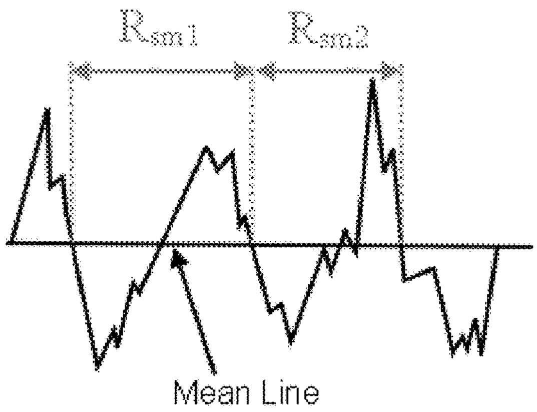

In FIG. 10, the graph 1001 depicts the Mean width of profile elements (RSm) is the arithmetic mean value of the widths of the profile elements of the roughness profile, where a profile element is a peak and valley in the roughness profile. The units of Rsm are micrometers or micro inches. The Root Mean Square Slope (Rsq) is the root mean square average of all local profile slopes. Each slope is calculated using a smoothing algorithm to reduce the effect of random noise on the value of Rsq.

It should be understood that all of the powder coated materials discussed above can be referenced as a substrate, and that the powder coating undergoes a thermal curing process and does not dry. It should also be understood that the baseboard is an optional application that will most likely not be used in any frequency in the contemplated embodiment.

In the contemplated embodiment, various types of substrates could be used; however, a steel or aluminum alloy is preferred. Also, the process of creating the powder coating materials includes the variable formulations of the Thermosetting and Thermoplastic resins to create a desired surface treatment or finish, which in turn affects the writing and displaying of different types of writing devices.

In one exemplary embodiment, the features discussed herein are used with chalk. The chalk application uses a board having powder coating materials such as, for example, urethane polyester, polyester TGIC, epoxy, epoxy polyester, and/or other suitable materials. The cured film thickness will be 2.5-5.0 mils (thousands of an inch) or 50-130 μm (micrometer). The finish will be a textured surface. The minimum surface roughness (+/−10%) will be RA=3.3365 μm (131.3582677 μm), RQ=4.17483333300 μm (164.3635171 μm), RZ=19.64283333 μm (773.339895 μm) with a maximum surface roughness (+/−10%) of RA=9.107875 μm (358.5777559 μin), RQ=11.89991667 μm (468.5006562 μin) RZ=64.169 μm (2526.338583 μin). The surface will have a minimum pencil hardness, ASTM D3363, of 2H minimum. The surface will have a gloss level according to ASTM 523 at 60° angle of 3-65 at +/−10%. To clean the surface it is completed using a soft, clean, non-abrasive cotton cloth, fiber cloth dry and/or with water/non-abrasive household cleaners.

In another exemplary embodiment, the multi-use application of the board is used, for example, with chalk and liquid chalk markers. The powder coating materials for this embodiment includes, for example, urethane polyester, polyester TGIC, epoxy, and epoxy polyester. The cured film thickness is 2.5-5.0 mils (thousands of an inch) 50-130 μm (Micrometer). The finish will be matte/textured with a minimum surface roughness (+/−10%) of RA=3.3365 μm (131.3582677 μin); RQ=4.17483333300 μm (164.3635171 μin); and RZ=19.64283333 μm (773.339895 μin), while the maximum surface roughness (+/−10%) is equal to RA=9.107875 μm (358.5777559 μin); RQ=11.89991667 μm (468.5006562 μin); and RZ=64.169 μm (2526.338583 μin). The minimum pencil hardness, ASTM D3363 is 2H minimum. The color is clear/variable colors. The gloss level according to ASTM 523 at 60° angle is 3-65 at +/−10 percent. To clean the surface, it is completed using a soft, clean, non-abrasive cotton cloth, fiber cloth dry and/or with water/non-abrasive household cleaners.

In another exemplary embodiment, the multi-use of the board is used, for example, with liquid chalk, dry and wet erase markers. The powder coating material for this embodiment includes, for example, urethane polyester, polyester TGIC, epoxy, epoxy polyester and/or suitable materials. The cured film thickness is 2.5-5.0 mils (thousands of inch) 50-130 μm (micrometer). The finish will be matte/gloss with a minimum surface roughness (+/−10%) of RA=0.2965 μm (11.67322835 μin); RQ=0.4285 μm (16.87007874 μin); RZ=1.53783 μm (60.54461942 μin), while the maximum surface roughness (+/−10%) is RA=3.3365 μm (131.3582677 μin); RQ=4.17483333300 μm (164.3635171 μin); and RZ=19.64283333 μm (RZ=773.339895 μin). The minimum pencil hardness, ASTM D3363 is 2H-4H minimum. The color is clear/variable colors. The gloss level according to ASTM 523 at 60° angle is 15-95+ at +/−10 percent. To clean the surface, it is completed using a soft, clean, non-abrasive cotton cloth, fiber cloth dry and/or with water/non-abrasive household cleaners.

In yet another exemplary embodiment, the board can be used with liquid chalk, dry & wet erase markers and permanent markers. The powder coating materials for this embodiment includes, for example, urethane polyester, polyester TGIC, epoxy, epoxy polyester and/or suitable materials. The cured film thickness is 2.5-5.0 mils (50-130 μm). The finish will be gloss/high gloss with a minimum surface roughness (+/−10%) of RA=0.2965 μm (11.67322835 μin); RQ=0.4285 μm (16.87007874 μin); RZ=1.53783 μm (60.54461942 μin), while the maximum surface roughness (+/−10%) is RA=3.3365 μm (131.3582677 μin); RQ=4.17483333300 μm (164.3635171 μin); and RZ=19.64283333 μm (RZ=773.339895 μin). The minimum pencil hardness, ASTM D3363 is 2H-4H minimum. The color is clear/variable colors. The gloss level according to ASTM 523 at 60° angle is 80-95+@+/−5 percent. To clean the surface, it is completed using a soft, clean, non-abrasive cotton cloth, fiber cloth dry and/or with water/non-abrasive household cleaners and with household rubbing alcohol-isopropyl alcohol 91% for the permanent markers.

Thus, in the contemplated embodiments, it will be appreciated that the limited powder coatings will allow multi use markers on the same board. For example, fine textured, powder coated process surface on a writing board would be used for chalk. A high gloss, very low porosity, tight cross linked powder coating process surface on a writing board would be used for wet erase, dry erase markers and permanent type markers. It is possible for chalk markers and dry erase and wet erase markers to be used on the same surface, however, residue from the chalk and the dry/wet erase marks may remain and require extensive cleaning. This type of board would be low gloss, low porosity, and fine textured powder coating process.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A writing board system, comprising:

a chalk writing device;

a dry-erase marker; and a board, having:

a frame;

a base board to be supported within the frame;

a substrate configured to be secured to the base board; and a thermosetting powder coating resin applied to the substrate, the thermosetting powder coating resin being composed of a compound;

a textured surface created by the thermosetting powder coating resin having a surface roughness greater than 0.8755 micrometer and less than 7.484 micrometer, thereby being adaptable for receiving chalk;

wherein the texture surface is suitable for writing on by the chalk writing device and the dry-erase marker because of the surface roughness; and wherein any writing on the textured surface can be removed via a cloth.

2. The system of claim 1, wherein the substrate is composed of a metallic material.

3. The system of claim 2, further comprising:

a magnet configured to magnetically engage with the substrate.

4. The system of claim 1, wherein the powder coating resin comprises:

a thickness of between 2.5 and 5.0 thousands of an inch.

5. The system of claim 1, wherein the powder coating resin comprises:

a minimum pencil hardness of 2H minimum.

6. The system of claim 1, wherein the powder coating resin comprises:

a minimum pencil hardness of between 2H and 4H.

7. A method to manufacture a writing board, comprising:

preparing a substrate;

spraying a thermosetting powder coating resin composed of a compound to the substrate to create a textured surface having a surface roughness greater than 0.8755 micrometer and less than 7.484 micrometer, thereby being adaptable for receiving chalk;

securing a prepared substrate to a base board; and securing the base board with the substrate within a frame;

wherein the prepared substrate is adapted to receive marking by a chalk writing device and a dry erase marker on the textured surface.

8. The method of claim 7, further comprising:

spraying the thermosetting powder coating resin at a thickness of between 2.5 and 5.0 thousands of an inch.

9. The method of claim 7, further comprising:

forming the thermosetting powder coating resin with a minimum pencil hardness of 2H minimum.

10. The method of claim 7, further comprising:

forming the thermosetting powder coating resin with a minimum pencil hardness of between 2H and 4H.

11. The system of claim 1, wherein the compound is urethane polyester.

12. The system of claim 1, wherein the compound is polyester TGIC.

* * * * *